C. A. BACKSTROM, DEC'D.
M. A. BACKSTROM, ADMINISTRATRIX.
WATER HEATER.
APPLICATION FILED MAY 15, 1917.

1,294,376.

Patented Feb. 18, 1919.
3 SHEETS—SHEET 1.

C. A. BACKSTROM, DEC'D.
M. A. BACKSTROM, ADMINISTRATRIX.
WATER HEATER.
APPLICATION FILED MAY 15, 1917.
1,294,376.
Patented Feb. 18, 1919.
2 SHEETS—SHEET 2.
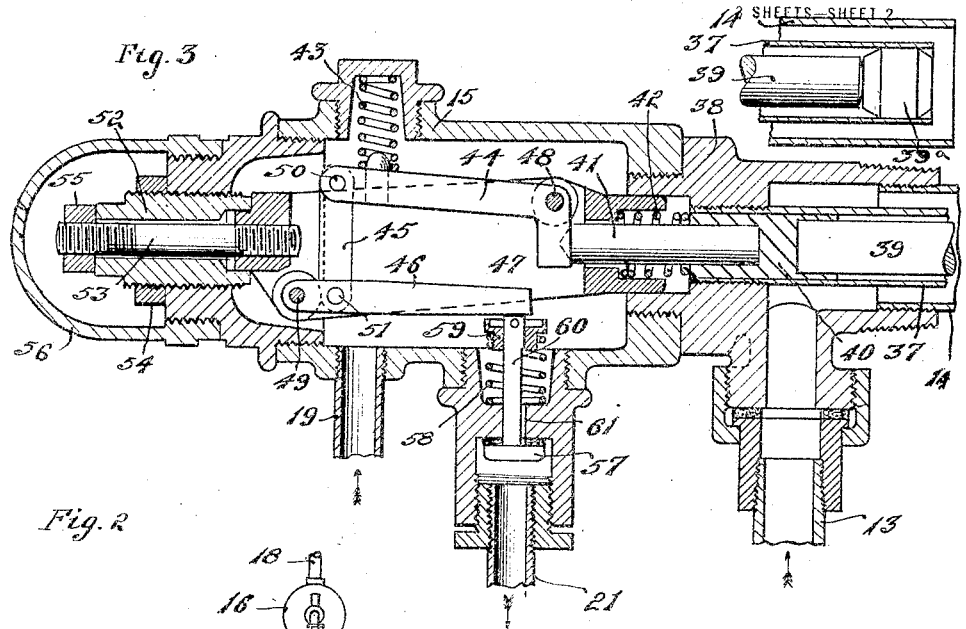
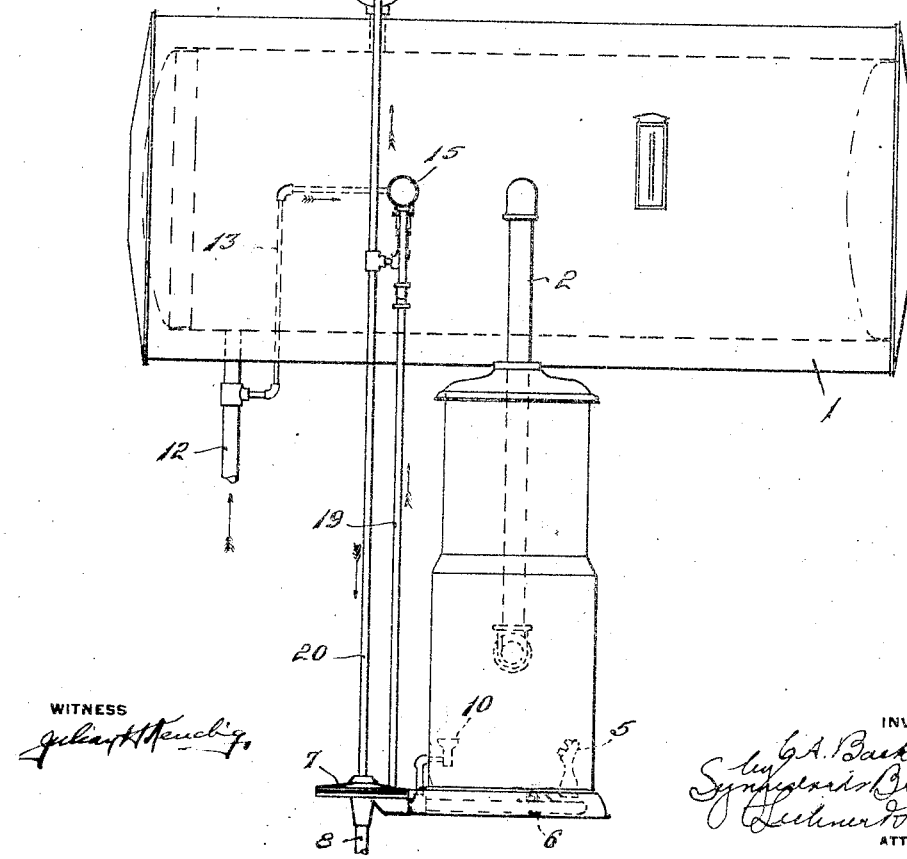
WITNESS
INVENTOR.
C. A. Backstrom
ATTORNEYS.

C. A. BACKSTROM, DEC'D.
M. A. BACKSTROM, ADMINISTRATRIX.
WATER HEATER.
APPLICATION FILED MAY 15, 1917.

1,294,376.

Patented Feb. 18, 1919.
3 SHEETS—SHEET 3.

UNITED STATES PATENT OFFICE.

CHARLES A. BACKSTROM, OF CRAFTON, PENNSYLVANIA; MARTHA A. BACKSTROM, ADMINISTRATRIX OF SAID CHARLES A. BACKSTROM, DECEASED, ASSIGNOR TO PITTSBURG WATER HEATER COMPANY, OF PITTSBURGH, PENNSYLVANIA, A CORPORATION OF NEW JERSEY.

WATER-HEATER.

1,294,376.  Specification of Letters Patent.   Patented Feb. 18, 1919.

Application filed May 15, 1917. Serial No. 168,707.

*To all whom it may concern:*

Be it known that I, CHARLES A. BACKSTROM, a citizen of the United States, residing at Crafton, in the county of Allegheny and State of Pennsylvania, have invented certain new and useful Improvements in Water-Heaters, of which the following is a specification.

The invention relates to water heaters and particularly to storage heaters, although not limited to such type of heaters. It has for its primary objects the provision of a heater of greater economy than those heretofore constructed; the provision of a heater in which there is no repeated heating and cooling of the body of water in the heater during relatively long periods of disuse (as for instance, during the night) such as is the case with the ordinary storage heater having thermostatic control; the provision of a heater having increased economy in that the gas may be turned on full by merely opening one of the hot water faucets after which the faucet can be closed until the water reaches the desired temperature, thus avoiding the waste of partially heated water such as occurs with the ordinary instantaneous water (valve) heater, in which the faucet must be kept open till the water reaches the desired temperature; the provision of a dual control heater in which the water valve or water motor causes the opening of the gas valve, but not the closing thereof and in which the thermostat causes the closing of the gas valve but not the opening thereof; and in general the provision of a simplified and improved control particularly adapted to storage heaters and having the advantages of both the thermostatic and water valve or motor controls, without the disadvantages incident to the usual combined or individual uses of such controls. One embodiment of the invention is illustrated in the accompanying drawings, wherein—

Figure 1:
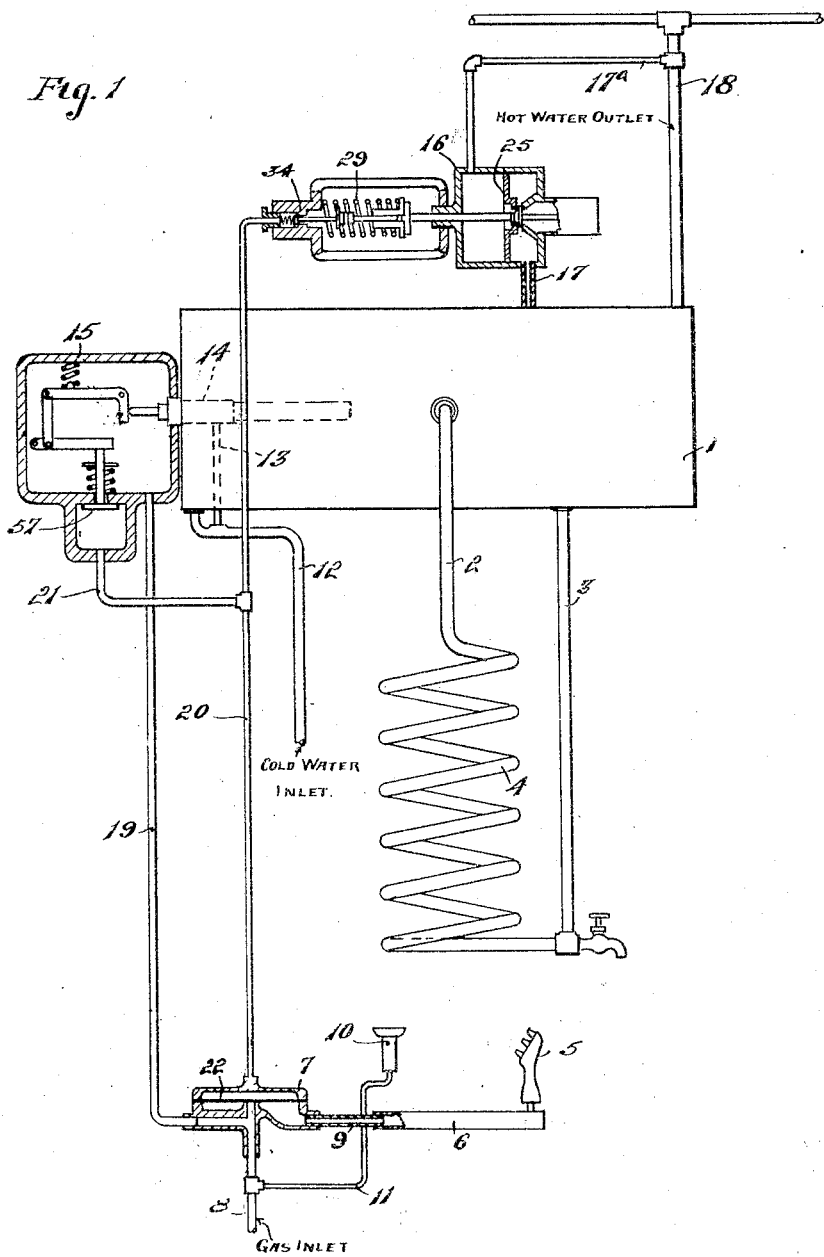
Figure 4:
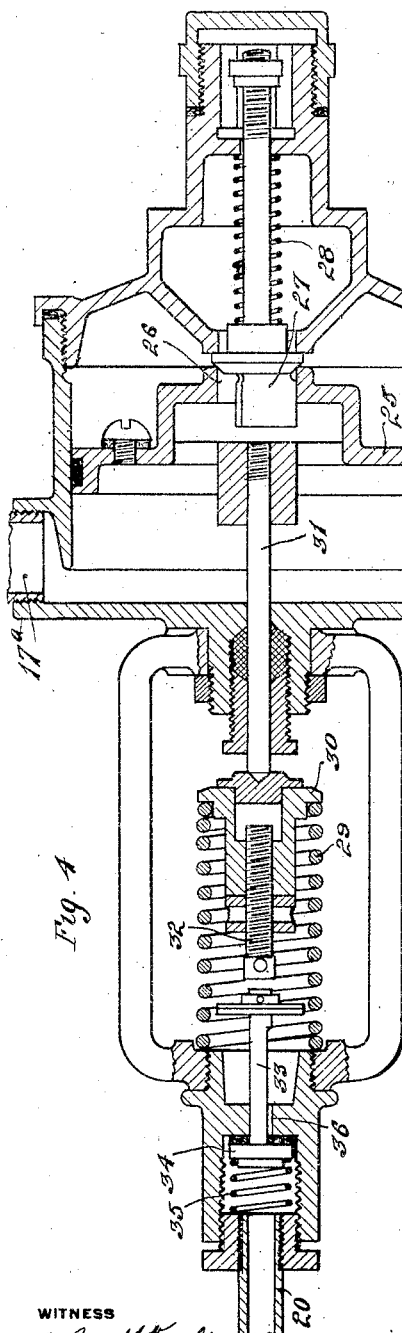
Figure 5:
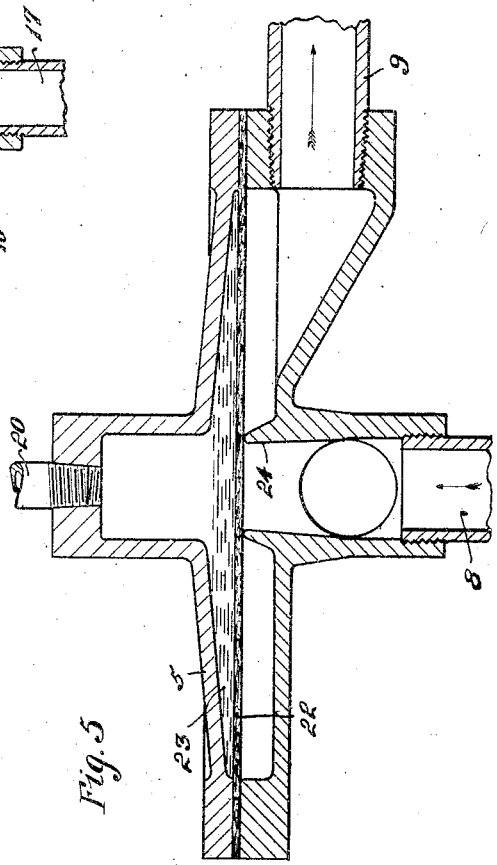

Figure 1 is a diagrammatic view showing certain of the parts somewhat out of their actual position in order to clearly illustrate all of the parts in a single view; Fig. 2 is a side elevation showing the parts in assembled relation as actually used; Fig. 3 is an enlarged section through the casing of the thermostatic mechanism; Fig. 4 is an enlarged section through the casing of the water valve or water motor; and Fig. 5 is an enlarged section through the gas valve casing.

Referring first to the general arrangement of parts in Fig. 1, the reference numeral 1 indicates the tank of the heater connected by the circulation pipes 2 and 3 with the heating coil 4; 5 is one of the burners carried by the burner ring 6; 7 is the gas valve casing to which gas is supplied from the supply pipe 8 and from which the gas flows to the burner ring 6 through the pipe 9; 10 is the pilot burner supplied from the pipe 11; 12 is the cold water inlet to the tank, such inlet having a branch 13 leading to a casing 14 surrounding the expansion element of the thermostat, for a purpose to be later explained; 15 is a casing surrounding a part of the thermostatic mechanism; 16 is the casing of the water valve or motor through which the by-pass 17, 17ª, from the tank leads; 18 is the hot water outlet pipe; and 19, 20, and 21 are supplementary gas pipes employed in controlling the gas valve from the thermostatic mechanism and the water valve or water motor.

At this point it may be stated that the arrangement which will now be described is such that the gas valve is controlled both from the thermostat and water valve and that this control is exercised by means of pressure from the gas main. Also that the arrangement is such that the opening of a faucet in the hot water outlet serves to open the gas valve, but that the closing of such faucet does not cause the closure of the valve, and that the thermostatic mechanism causes the closing of the gas valve when the temperature of the water reaches a predetermined point, but that such thermostat does not cause the opening of the gas valve when the temperature of the water in the heater is reduced. It follows from this arrangement that if no water is drawn from the heater for a long period there is no waste of gas, since during this period, the gas, aside from the small amount used at the pilot burner, is not turned on. It also follows that in order to open the gas valve and start the heating of the water, all that is necessary is the opening of one of the hot water faucets, after which such faucet may be closed, the thermostat acting to cut off the flow of gas when the water reaches the temperature at which the thermostat is set to act.

In carrying out the invention in its preferred form, a diaphragm gas valve is used, which gas valve will close when the gas pressure on the two sides thereof is the same. When a hot water faucet is opened the water motor acts to release the gas pressure on the closing side of the diaphragm so that gas is supplied to the burners of the heater. When the temperature of the water in the heater reaches the point for which the thermostat is set, the thermostat acts to re-admit pressure to the closing side of the diaphragm, thus causing the cutting off of the gas supply. In this way the water valve is made to cause the opening of the gas valve but not the closing thereof, and the thermostat is made to cause the closing of the gas valve but not the opening thereof. The following description of the gas valve, thermostatic mechanism and water valve or motor, will make clear the manner in which the foregoing operation is carried out.

The gas valve is shown in Fig. 5, and comprises the casing 5 made in two pieces between which pieces is clamped the diaphragm 22 preferably of fibrous material and carrying on its upper side a liquid 23, which liquid gives the necessary weight for closing the valve when the gas pressures on the opposite sides of the diaphragm are equal. When such pressures are equal the diaparagm occupies the position shown in Fig. 5 at which time it rests upon the seat 24 and cuts off communication between the inlet pipe 8 and the pipe 9 leading to the burner ring (Fig. 1). The pressure on the lower side of the diaphragm is constant, but that on the upper side is varied through the control of the thermostat and water motor, as hereinafter set forth, the release of the pressure on the upper side of the diaphragm or the increase in such pressure, being accomplished through the pipe 20 whose ends lead to the thermostatic mechanism and the water motor.

The water motor or water valve, as it is commonly known in the art, is illustrated in Fig. 4. It comprises a piston 25 working in the casing 16 and having a port 26 through its central portion, such port being normally closed by the check member 27 held yieldingly in forward position by means of the spring 28. This water valve involves certain novel features in the matter of detail but no claim is made thereto in this application. The actuating water is admitted to the casing through the inlet 17 on the rear side of the piston 25 and flows from the casing through the pipe 17ª leading from the front side of the piston, so that whenever a faucet in the piping connecting to the outlet 18 is opened, the piston 25 is moved to the left, thus carrying the piston away from the plug 27 and permitting water to pass through the piston from the rear side to the front side. The piston is normally held in the position illustrated, by means of the spring 29 which forces the block 30 carried by the piston rod 31 to the right, and the block 30 carries an adjustable screw 32 which is adapted to engage the stem 33 of the release valve 34. The release valve 34 is normally held closed by the spring 35 so that the outlet from the pipe 20 is closed when the parts occupy the position indicated in Fig. 4.

The opening of the outlet from the heater and the consequent movement of the piston to the left, causes the movement of the valve 34 to the left and release in pressure in the pipe 20 or the chamber carrying the spring 35, such release occurring through the opening 36 along the valve stem 33. Since the pipe 20 leads to the upper side of the diaphragm 22 the opening of the outlet from the heater and the consequent opening movement of the valve 34, as just described, will release the pressure above the diaphragm and the diaphragm will rise, permitting a flow of gas from the main 8 to the burner ring.

The thermostatic mechanism is illustrated in Fig. 3 and includes the expansible tube 37 carried by the block 38 which is screwed into the shell of the tank. The inner end of this tube has secured therein the plug 39ª against which the inner end of the porcelain rod 39 bears, as illustrated. In the other or left-hand end of the tube the metal block 40 is slidably mounted, such block carrying the pin 41. The contraction of the tube 37, when the water cools, carries the porcelain rod 39 and the pin 41 to the left, while the expansion of the tube 37 incident to the rise in temperature of the heater water, permits the spring 42 acting with the spring 43, to cause the movement of the block 40 and pin 41 carried thereby to the right. A series of three levers, 44, 45, and 46 are carried by the cage 47, the lever 44 being pivoted at 48 to the cage and the lever 46 being pivoted to the cage at 49, while the link 45 is pivotally connected to the levers 44 and 46 at 50 and 51. The cage 47 which carries the levers, fits into the manifold 38 at its right-hand end, while at its left-hand end it is secured to the adjusting plug 52 by means of the bolt 53, the plug being locked in position by the nut 54 and the bolt by the nut 55, over which extends the cap 56. The details of the thermostat are immaterial in so far as the present invention is concerned.

Mounted in the lower side of the casing 15 is the valve 57, such valve being normally held closed by the spring 58 bearing against the head 59 on the stem 60. The opening 61 permits a flow of pressure past the valve when the valve is moved down from the position illustrated. Fluid pressure is supplied to the casing 15 through the pipe 19 (Fig. 1) and when the valve 57 is in open position such pressure is communicated through the pipes 21 and 20 to the upper side of the gas valve diaphragm. The valve 57 is opened to permit the flow of fluid just referred to when the temperature of the water in the heater rises above a predetermined point. At such time the tube 37 expands permitting the pin 41 to move to the right under the influence of the spring 42, and the spring 43 causes the downward movement of the right-hand end of the lever 46, thus opening the valve 57 and permitting a flow of gas to the upper side of the gas valve diaphragm.

In order that the gas valve 57 may be closed with certainty at any time when the valve 34 is opened so that there may be no substantial escape of gas to the atmosphere at such time, the pipe 13 is provided (Figs. 1 and 3), which pipe leads to the casing 14 surrounding the expansible thermostat tube 37 and opening at its inner end into the tank, as illustrated in the small sketch above the right-hand side of Fig. 3. As a result of this arrangement any outflow of water from the heater causes an inflow of cold water through the pipe 13 and the casing 14 along the expansible member 37 so that such member is instantly cooled upon the opening of the outlet from the heater and the valve 57 is promptly closed, if it should happen to be open at the time the outlet from the heater is opened.

With the foregoing description of the gas valve, water motor, and thermostatic means, the operation of the device will be clear from the following description by reference to Fig. 1, which shows all of the parts referred to. Assuming that the heater has been standing for a considerable period and that the water is cold, the parts will occupy the position of Fig. 1, with the valves 34 and 57 closed. At this time there is gas main pressure in the pipes 21 and 20 and the chamber above the gas valve diaphragm holding it in closed position, such pressure having been supplied during a previous operation, when the water reached the required degree of hotness and the thermostatic means opened the valve 57, placing the pipes 19 and 21 in communication. If now the outlet from the heater is opened, the pressure on the front side of the piston 25 is released and such piston moves to the left causing the opening of the release valve 34. This opening of the release valve permits an escape of pressure from the pipe 20 and the chamber above the diaphragm 22 of the gas valve. The greater pressure on the lower side of the diaphragm therefore, causes it to move away from its seat and permits a flow of gas from the main 8 to the burner ring 6. This flow of gas continues as long as the outlet from the heater is open, since there is a flow of cold water during such period through the pipe 13 and along the thermostat, so that the valve 57 is kept closed. When the outlet from the heater is closed, the piston 25, under the influence of the spring 29 moves back to the position shown in Fig. 1 permitting the valve 34 to close. When the temperature of the water in the heater rises above the point for which the thermostat is set, the expansion of the thermostat tube causes the opening of the valve 57 so that pressure is supplied via the pipe 19, casing 15, and pipes 21 and 20 to the upper side of the gas valve diaphragm 22, and this diaphragm moves down engaging its seat and cutting off the flow of gas to the burner ring 6.

It will be seen from the foregoing that the water valve operates to cause the opening of the gas valve but not its closing, and that the thermostatic mechanism operates to cause the closing of the gas valve but not its opening, so that during a long period of non-use of water there is no turning on and off of the gas such as is the case with the ordinary storage system equipped with a thermostatic control. It will also be seen that the mere opening of a faucet in the outlet will open the gas valve and that after such opening of the gas valve it becomes unnecessary to keep the faucet open, since the gas will not be shut off until the water rises above a predetermined temperature as governed by the thermostat, the construction thus differing from the ordinary instantaneous heater having dual control wherein it is necessary to keep the faucet open until the water reaches the predetermined temperature. This latter operation involves a considerable waste of water, particularly where the gas supply is inadequate as in very cold weather, at which time it may be either practically impossible to secure water of the desired temperature or in case such temperature is secured may involve a long period of running the water before the desired temperature is reached. This difficulty is avoided with the present apparatus in which there is no waste of heat during the period in which the water is being brought to the desired temperature.

The embodiment of the invention shown and described is of course merely illustrative of the broad invention which is not restricted to the specific mechanism. Any water motor might be employed which would act to open the relief valve upon changes of pressure induced by opening the outlet from the heater. Many different forms of thermostatic mechanism or gas valves might also be employed other than the ones shown. The invention broadly considered comprehends a wide variety of specific combinations for achieving the desired result, namely, the turning on of the gas to the heater when the outlet from the heater is opened, but without turning off of the gas when the outlet is closed, and the turning off of the gas by the thermostat when the water is heated to the proper temperature but without such thermostat acting to turn on the gas again when the water cools. The invention may also be applied where a plurality of heaters are employed with a common hot water outlet, in which case the single water motor would control the release of gas from the upper sides of the plurality of diaphragm gas valves. A single thermostatic mechanism would in such case also serve to govern the closing of the plurality of gas valves.

What I claim is:

1. In a gas water heater having an outlet faucet, the combination of a water heating means including a burner and a gas conduit therefor, cut-off means normally closing off the gas in the conduit, a hot water passage leading from the water heating means to the faucet and provided with water valvular means associated with the cut-off means whereby the opening of the outlet faucet permits a flow of gas to the burner regardless of the closing of the faucet, and a thermostatic means governed by the water of the heater and constructed and arranged to control the turning off of the gas by said cut-off means, but not the turning on thereof.

2. In combination in a water heater, of gas heating means, and thermostatic controlling means and water motor controlling means for said gas heating means constructed and arranged so that the water motor controlling means causes the turning on of the gas when an outlet faucet is opened but not the cutting off thereof when the faucet is closed, and so that the thermostatic controlling means causes the cutting off of the gas when the temperature of the water rises above a predetermined point, but not the turning on of such gas when the water cools.

3. In combination in a water heater, a container for water to be heated, a gas burner, a gas conduit leading thereto, pressure operated means actuated by opening of the outlet from the heater, and temperature governed means actuated by the water in the heater when the temperature thereof rises above a predetermined point, the said pressure operated means being effective to open the conduit and permit a flow of gas to the burners but not effective to close the conduit, and the temperature governed means being effective to close the conduit but not to open it.

4. In combination in a water heater, a container for water to be heated, a gas burner, a gas conduit, cut-off means in the conduit, a motor governed by opening the outlet from the heater, a thermostatic means governed by the water of the heater, and means whereby the opening of the outlet from the heater and the operation of the motor causes the opening of the cut-off means permitting a flow of gas to the burner regardless of the subsequent closing of the heater outlet and whereby the thermostatic means causes the closure of the cut off means after the outlet from the heater is closed when the water is above a predetermined temperature.

5. In combination in a water heater, a container for water to be heated, a gas burner, a gas conduit leading thereto, a motor operating by the opening of the outlet from the heater to cause the opening of the conduit and permit a flow of gas to the burner, but leaving the conduit open after the outlet is closed, and thermostatic means governed by the water of the heater and operating to cause a closure of the conduit when the temperature of the water reaches a predetermined point, but after such closure leaving the conduit closed until it is caused to open by the operation of the said motor.

6. In combination in a water heater, a container for water to be heated, a gas burner, a gas conduit leading thereto, a motor and coöperating means adapted to cause the opening of the conduit when the outlet from the heater is opened but not the closing of such conduit when the outlet is closed, and a thermostatic means and coöperating means adapted to cause the closure of the conduit when the temperature of the water rises above a predetermined point, but not the opening of such conduit when the water drops below such temperature.

7. In combination in a water heater, a container for water to be heated, a gas burner, a gas conduit leading thereto, a gas valve in the conduit, a water motor operated by changes of pressure incident to opening and closing the outlet from the heater, thermostatic means governed by the temperature of the heater water, and means coöperating between the motor, thermostatic means and the gas valve whereby the opening of the outlet from the heater causes the actuation of the motor and the opening of the gas valve after which the motor is ineffective to close the gas valve, and whereby the actuation of the thermostatic means after the water reaches a predetermined temperature causes the closing of the gas valve, after which the thermostatic means is ineffective to open the gas valve.

8. In combination in a water heater, a container for water to be heated, a gas burner, a gas conduit leading thereto, a gas valve in the conduit, a pressure chamber to which fluid pressure may be applied to close the gas valve, a passage for conducting pressure from the conduit to said chamber, a controlling valve in the passage, a thermostatic means governed by the heater water and adapted to open said controlling valve when the temperature of the water rises above a predetermined point, a release outlet whereby the pressure in the said pressure chamber may be released, and a water motor operated by the opening of the outlet from the heater for opening the said release outlet.

9. In combination in a water heater, a container for water to be heated having a cold water inlet and a hot water outlet, a gas burner, a gas conduit leading thereto, a gas valve in the conduit, a pressure chamber to which fluid pressure may be applied to close the gas valve, a passage for conducting pressure from said conduit to said chamber, a controlling valve in the passage, a thermostatic means governed by the heater water arranged to open said controlling valve when the temperature of the water rises above a predetermined point, one of the parts of the thermostat being arranged so that a part at least of the inflowing water from the cold water inlet flows over it, a release outlet whereby the pressure in said chamber may be released, and a water motor operated by the opening of the hot water outlet from the heater for opening the said release outlet.

10. In combination in a water heater, a container for water to be heated having a cold water inlet and a hot water outlet, a gas burner, a gas conduit leading thereto, a gas valve in the conduit, a pressure chamber to which fluid pressure may be applied to close the gas valve, a passage for conducting pressure from said conduit to said chamber, a controlling valve in the passage, a thermostatic means having an expansible member located in the said water container, a casing fitting around said member and opening into the container, connections whereby the thermostatic means opens the controlling valve when the temperature of the water rises above a predetermined point, means whereby a portion at least of the inflowing water from the cold water inlet is directed into the said casing around the thermostat member, a release outlet whereby the pressure in said chamber may be released, and a water motor operated by the opening of the hot water outlet from the heater for opening the said release outlet.

11. In combination in a water heater, a container for water to be heated, a gas burner, a gas conduit leading thereto, a gas valve in the conduit, a water motor operated by changes of pressure incident to opening and closing the outlet from the heater, thermostatic means governed by the temperature of the heater water, and means coöperating between the motor, thermostatic means and the gas valve whereby the opening of the outlet from the heater causes the actuation of the motor and the opening of the gas valve after which the closing of the heater outlet leaves the gas valve open, and whereby the actuation of the thermostatic means after the water reaches a predetermined temperature causes the closing of the gas valve after which any lowering of the temperature of the water still leaves the gas valve shut, which position is maintained until the outlet from the heater is again opened.

12. In combination in a water heater, a container for water to be heated, a gas burner, a gas conduit leading thereto, a gas valve in the conduit, a water motor operated by changes of pressure incident to opening and closing the outlet from the heater, thermostatic means governed by the temperature of the heater water, and means coöperating between the motor, thermostatic means and the gas valve whereby the water motor is effective to open the gas valve but not to close it and whereby the thermostatic means is effective to close the gas valve but not to open it, the gas valve remaining closed until it is again opened by the water motor when the outlet from the heater is opened.

CHARLES A. BACKSTROM.